(12) United States Patent
Li

(10) Patent No.: US 9,462,031 B2
(45) Date of Patent: Oct. 4, 2016

(54) METHOD, SYSTEM AND DEVICE FOR AUDIO COMMUNICATION MODULATION MODE SELF-ADAPTATION AND ELECTRONIC SIGNATURE TOKEN

(71) Applicant: Tendyron Corporation, Beijing (CN)

(72) Inventor: Dongsheng Li, Beijing (CN)

(73) Assignee: Tendyron Corporation (CN)

( * ) Notice: Subject to any disclaimer, the term of this patent is extended or adjusted under 35 U.S.C. 154(b) by 0 days.

(21) Appl. No.: 14/409,228

(22) PCT Filed: Jun. 9, 2013

(86) PCT No.: PCT/CN2013/077108
§ 371 (c)(1),
(2) Date: Dec. 18, 2014

(87) PCT Pub. No.: WO2013/189256
PCT Pub. Date: Dec. 27, 2013

(65) Prior Publication Data
US 2015/0163278 A1    Jun. 11, 2015

(30) Foreign Application Priority Data
Jun. 21, 2012  (CN) .......................... 2012 1 0211828

(51) Int. Cl.
*H04B 7/00* (2006.01)
*H04L 29/06* (2006.01)
(Continued)

(52) U.S. Cl.
CPC ............. *H04L 65/607* (2013.01); *H04B 11/00* (2013.01); *H04L 5/1453* (2013.01);
(Continued)

(58) Field of Classification Search
CPC ... H04W 76/02; H04W 76/04; H04W 88/06; H04W 88/10

USPC ....... 370/310, 328, 329, 349, 350, 464, 465, 370/537
See application file for complete search history.

(56) References Cited

U.S. PATENT DOCUMENTS 5,023,869 A * 6/1991 Grover .................. H04L 5/1446
370/421
6,192,070 B1 * 2/2001 Poon ..................... H04B 1/005
329/372
(Continued)

FOREIGN PATENT DOCUMENTS

| CN | 1255019 A | 5/2000 |
| CN | 1954367 A | 4/2007 |

(Continued)

OTHER PUBLICATIONS

International Search Report and Written Opinion for Application No. PCT/CN2013/077108 dated Sep. 19, 2013.

*Primary Examiner* — Dmitry H Levitan
(74) *Attorney, Agent, or Firm* — Lerner, David, Littenberg, Krumholz & Mentlik, LLP

(57) ABSTRACT

A method and system for audio communication modulation mode self-adaptation, an apparatus for audio communication modulation mode self-adaptation in a mobile terminal and an electronic signature token are provided. The method includes modulating first audio data to generate first audio data frame streams; modulating second audio data to generate second audio data frame streams; demodulating the second audio data stream to obtain modulation modes correctly received by the first device and supported by the second device and modulation modes correctly received by the second device and supported by the first device; selecting an optimal modulation mode used in the second device from the modulation modes correctly received by the second device and supported by the first device, and selecting an optimal modulation mode used in the first device from the modulation modes correctly received by the first device and supported by the second device, according to a predetermined rule.

30 Claims, 2 Drawing Sheets

(51) Int. Cl.
*H04L 5/14* (2006.01)
*H04L 27/00* (2006.01)
*H04B 11/00* (2006.01)
*G06F 21/34* (2013.01)

(52) U.S. Cl.
CPC ...... *H04L 27/0008* (2013.01); *H04L 27/0012* (2013.01); *H04L 63/0853* (2013.01); *H04L 65/601* (2013.01); *H04L 69/22* (2013.01); *G06F 21/34* (2013.01)

(56) References Cited

U.S. PATENT DOCUMENTS

| | | | | |
|---|---|---|---|---|
| 6,249,543 B1 * | 6/2001 | Chow | ............... | H04L 5/007 370/468 |
| 7,145,880 B2 * | 12/2006 | Saxena | ............... | H04L 1/0003 370/252 |
| 7,167,108 B2 * | 1/2007 | Chu | ............... | H04N 19/70 341/51 |
| 7,440,517 B1 * | 10/2008 | Henne | ............... | H04L 27/0008 375/324 |
| 7,986,878 B2 * | 7/2011 | Saunders | ............... | H04B 10/5053 398/25 |
| 8,036,298 B2 * | 10/2011 | Kim | ............... | H04L 1/0015 370/334 |

FOREIGN PATENT DOCUMENTS

| | | |
|---|---|---|
| CN | 1960498 A | 5/2007 |
| CN | 102769591 A | 11/2012 |

\* cited by examiner

METHOD, SYSTEM AND DEVICE FOR AUDIO COMMUNICATION MODULATION MODE SELF-ADAPTATION AND ELECTRONIC SIGNATURE TOKEN

CROSS-REFERENCE TO RELATED APPLICATIONS

The present application is a national phase entry under 35 U.S.C. §371 of International Application No. PCT/CN2013/077108 filed Jun. 9, 2013, which claims priority from Chinese Patent Application No. 201210211828.2 filed Jun. 21, 2012 all of which are incorporated herein by reference.

FIELD

The present disclosure relates to an electronic technique field, and more particularly to a method for audio communication modulation mode self-adaptation, a system for audio communication modulation mode self-adaptation, mobile terminal for audio communication modulation mode self-adaptation, and an electronic signature token.

BACKGROUND

In a current audio data transmission via an audio interface, different mobile terminals have different audio transmission characteristics. In order to be compatible with the audio transmission characteristics of different mobile terminals, an apparatus (such as an electronic signature token) communicating with the mobile terminal needs to try with audio data in different modulation modes automatically so as to find a most suitable modulation mode matched with each of the different mobile terminals.

Currently, there are few audio communication means, and consequently no suitable mode can be compatible with the communication between different mobile terminals and different electronic signature tokens.

Moreover, since both sides in the communication may not necessarily be fixed and can have their own different audio transmission characteristics, when the demodulation mode and the modulation mode not matched with each other are adopted during the audio data transmission, a data interaction speed may be reduced and it is easy for a distortion to occur in the interactive data.

SUMMARY

Embodiments of the present disclosure seek to solve at least one of the problems existing in the related art.

Accordingly, a first objective of the present disclosure is to provide a method for audio communication modulation mode self-adaptation, which can determine an audio modulation mode quickly, such that audio data interaction may be performed quickly and the distortion degree of the interactive data may be largely reduced. A second objective of the present disclosure is to provide a system for audio communication modulation mode self-adaptation. A third objective of the present disclosure is to provide an apparatus for audio communication modulation mode self-adaptation in a mobile terminal A fourth objective of the present disclosure is to provide an electronic signature token.

In order to achieve the above objectives, a method for audio communication modulation mode self-adaptation according to embodiments of a first aspect of the present disclosure comprises: modulating by a first device first audio data to be sent using at least two modulation modes supported by the first device respectively to generate first audio data frame streams in the at least two modulation modes; splicing by the first device the first audio data frame streams in the at least two modulation modes into a first audio data stream; sending the first audio data stream to a second device via an audio interface of the first device; demodulating by the second device the first audio data stream to obtain modulation modes correctly received by the second device and supported by the first device; modulating by the second device second audio data to be sent using at least two modulation modes supported by the second device to generate second audio data frame streams in the at least two modulation modes, in which the second audio data to be sent comprise the modulation modes correctly received by the second device and supported by the first device; splicing by the second device the second audio data frame streams in the at least two modulation modes into a second audio data stream, and sending the second audio data stream to the first device via an audio interface of the second device; demodulating by the first device the second audio data stream to obtain modulation modes correctly received by the first device and supported by the second device and to obtain modulation modes correctly received by the second device and supported by the first device; and selecting by the first device an optimal modulation mode used in the second device from the modulation modes correctly received by the second device and supported by the first device, and selecting by the first device an optimal modulation mode used in the first device from the modulation modes correctly received by the first device and supported by the second device, according to a predetermined rule.

With the method for audio communication modulation mode self-adaptation according to embodiments of the present disclosure, since audio data frame streams modulated using various modulation modes are spliced into a single audio data stream, data interaction may be performed at once, thus enhancing the data interaction speed. Meanwhile, a first audio modulation mode may be quickly determined, such that the first device may communicate with the second device via the first audio modulation mode, thus further enhancing the data interaction speed and largely reducing the distortion degree of interactive data.

In an embodiment, sending the first audio data stream to the second device via the audio interface of the first device comprises sending the first audio data stream to the second device via the audio interface of the first device at once and in a same time reference frame, and sending the second audio data stream to the first device via the audio interface of the second device comprises sending the second audio data stream to the first device via the audio interface of the second device at once and in a same time reference frame.

In an embodiment, the same time reference frame means that for each modulation waveform, an interval between a start moment and/or an end moment and a predetermined reference moment is predetermined.

In an embodiment, demodulating by the second device the first audio data stream to obtain the modulation modes correctly received by the second device and supported by the first device comprises: demodulating by the second device the first audio data stream, finding by the second device a start moment of each modulation waveform according to the predetermined reference moment, demodulating by the second device the modulation waveform according to the start moment to obtain the first audio data, determining by the second device whether the first audio data is correct according to the predetermined rule, and if yes, obtaining by the second device the modulation modes correctly received by the second device and supported by the first device.

In an embodiment, demodulating by the first device the second audio data stream to obtain the modulation modes correctly received by the first device and supported by the second device and the modulation modes correctly received by the second device and supported by the first device comprises: demodulating by the first device the second audio data stream, finding by the first device a start moment of each modulation waveform according to the predetermined reference moment, demodulating by the first device the modulation waveform according to the start moment to obtain the second audio data, determining by the first device whether the second audio data is correct according to the predetermined rule, and if yes, obtaining by the first device the modulation modes correctly received by the first device and supported by the second device.

In an embodiment, sending the first audio data stream to the second device via the audio interface of the first device comprises sending the first audio data stream to the second device via the audio interface of the first device at once and in different time reference frames, and sending the second audio data stream to the first device via the audio interface of the second device comprises sending the second audio data stream to the first device via the audio interface of the second device at once and in different time reference frames.

In an embodiment, the different time reference frames mean that for each modulation waveform, a start moment is carried in a synchronization header information.

In an embodiment, generating the first audio data frame streams by the first device comprises modulating by the first device the first audio data to be sent into the first audio data frame streams and generating by the first device a synchronization header information, and adding by the first device the generated synchronization header information to the first audio data frame streams for indicating a start moment of each modulation mode; and generating the second audio data frame streams by the second device comprises modulating by the second device the second audio data to be sent into the second audio data frame streams and generating by the second device a synchronization header information, and adding by the second device the generated synchronization header information to the second audio data frame streams for indicating a start moment of each modulation mode.

In an embodiment, demodulating by the second device the first audio data stream to obtain the modulation modes correctly received by the second device and supported by the first device comprises: demodulating by the second device the first audio data stream sent from the first device, finding by the second device synchronization headers of the modulation waveforms modulated using the modulation modes supported by the first device respectively, acquiring by the second device a synchronization information of each modulation waveform, finding a start moment of each modulation waveform according to the synchronization information, demodulating by the second device the modulation waveform according to the start moment to obtain the first audio data, determining by the second device whether the first audio data is correct according to the predetermined rule, and if yes, obtaining by the second device the modulation modes correctly received by the second device and supported by the first device.

In an embodiment, demodulating by the first device the second audio data stream to obtain the modulation modes correctly received by the first device and supported by the second device and the modulation modes correctly received by the second device and supported by the first device comprises: demodulating by the first device the second audio data stream sent from the second device, finding by the first device synchronization headers of the modulation waveforms modulated using the modulation modes supported by the second device respectively, acquiring by the first device a synchronization information of each modulation waveform, finding by the first device a start moment of each modulation waveform according to the synchronization information, demodulating by the first device the modulation waveform according to the start moment to obtain the second audio data, determining by the first device whether the second audio data is correct according to the predetermined rule, and if yes, obtaining by the first device the modulation modes correctly received by the first device and supported by the second device.

In an embodiment, the first audio data and the second audio data comprise data in a predetermined fixed format and/or transmission data containing variable contents.

In an embodiment, the method further comprises: modulating by the first device third audio data using the optimal modulation mode used in the second device to generate third audio data frame streams, in which the third audio data comprise the optimal modulation mode used in the second device and the optimal modulation mode used in the first device; and sending by the first device the third audio data frame streams to the second device via the audio interface of the first device.

In an embodiment, the method further comprises: modulating by the first device third audio data using the optimal modulation mode used in the second device to generate third audio data frame streams, in which the third audio data comprise the optimal modulation mode used in the second device, the optimal modulation mode used in the first device and audio data to be sent; and sending by the first device the third audio data frame streams to the second device via the audio interface of the first device.

In an embodiment, the method further comprises: obtaining by the second device the optimal modulation mode used in the second device and the optimal modulation mode used in the first device according to the third audio data frame streams, modulating by the second device response audio data using the optimal modulation mode used in the second device, and sending by the second device the modulated response audio data to the first device.

In an embodiment, the first audio data frame streams are generated by modulating the first audio data to be transmitted into an analog waveform signal using the modulation modes supported by the first device to generate the first audio data frame streams; and the second audio data frame streams are generated by modulating the second audio data to be transmitted into an analog waveform signal using the modulation modes supported by the second device to generate the second audio data frame streams.

In an embodiment, the first audio data further comprises identifiers of the at least two modulation modes supported by the first device; and the second audio data further comprises identifiers of the modulation modes obtained and correctly received by the second device and supported by the first device and identifiers of the at least two modulation modes supported by the second device.

In an embodiment, the first device is a mobile terminal, and the second device is an electronic signature token.

In order to achieve the above objectives, a system for audio communication modulation mode self-adaptation according to embodiments of a second aspect of the present disclosure comprises a first device and a second device connected with each other via audio interfaces, in which the first device is configured for modulating first audio data to be sent using at least two modulation modes supported by the first device respectively to generate first audio data frame streams in the at least two modulation modes, splicing the first audio data frame streams in the at least two modulation modes into a first audio data stream, sending the first audio data stream to the second device via the audio interface of the first device, demodulating a second audio data stream to obtain modulation modes correctly received by the first device and supported by the second device and to obtain modulation modes correctly received by the second device and supported by the first device, and selecting an optimal modulation mode used in the second device from the modulation modes correctly received by the second device and supported by the first device, and selecting an optimal modulation mode used in the first device from the modulation modes correctly received by the first device and supported by the second device, according to a predetermined rule; the second device is configured for demodulating the first audio data stream to obtain modulation modes correctly received by the second device and supported by the first device, modulating second audio data to be sent using at least two modulation modes supported by the second device to generate second audio data frame streams in the at least two modulation modes, in which the second audio data comprise the modulation modes correctly received by the second device and supported by the first device, splicing the second audio data frame streams in the at least two modulation modes into the second audio data stream, and sending the second audio data stream to the first device via the audio interface of the second device.

With the system for audio communication modulation mode self-adaptation according to embodiments of the present disclosure, since audio data frame streams modulated using various modulation modes are spliced into a single audio data stream, data interaction may be performed at once, thus enhancing the data interaction speed. Meanwhile, a first audio modulation mode may be quickly determined, such that the first device may communicate with the second device via the first audio modulation mode, thus further enhancing the data interaction speed and largely reducing the distortion degree of the interactive data.

In an embodiment, sending the first audio data stream to the second device via the audio interface of the first device comprises sending the first audio data stream to the second device via the audio interface of the first device at once and in a same time reference frame, and sending the second audio data stream to the first device via the audio interface of the second device comprises sending the second audio data stream to the first device via the audio interface of the second device at once and in a same time reference frame.

In an embodiment, the same time reference frame means that for each modulation waveform, an interval between a start moment and/or an end moment and a predetermined reference moment is predetermined.

In an embodiment, the second device is further configured for: demodulating the first audio data stream, finding a start moment of each modulation waveform according to the predetermined reference moment, demodulating the modulation waveform according to the start moment to obtain the first audio data, determining whether the first audio data is correct according to the predetermined rule, and if yes, obtaining the modulation modes correctly received by the second device and supported by the first device.

In an embodiment, the first device is further configured for: demodulating the second audio data stream, finding a start moment of each modulation waveform according to the predetermined reference moment, demodulating the modulation waveform according to the start moment to obtain the second audio data, determining whether the second audio data is correct according to the predetermined rule, and if yes, obtaining the modulation modes correctly received by the first device and supported by the second device.

In an embodiment, sending the first audio data stream to the second device via the audio interface of the first device comprises sending the first audio data stream to the second device via the audio interface of the first device at once and in different time reference frames, and sending the second audio data stream to the first device via the audio interface of the second device comprises sending the second audio data stream to the first device via the audio interface of the second device at once and in different time reference frames.

In an embodiment, the different time reference frames mean that for each modulation waveform, a start moment is carried in a synchronization header information.

In an embodiment, generating the first audio data frame streams by the first device comprises modulating by the first device the first audio data to be sent into the first audio data frame streams and generating by the first device a synchronization header information, and adding by the first device the generated synchronization header information to the first audio data frame streams for indicating a start moment of each modulation mode; and generating the second audio data frame streams by the second device comprises modulating by the second device the second audio data to be sent into the second audio data frame streams and generating by the second device a synchronization header information, and adding by the second device the generated synchronization header information to the second audio data frame streams for indicating a start moment of each modulation mode.

In an embodiment, the second device is further configured for: demodulating the first audio data stream sent from the first device, finding synchronization headers of the modulation waveforms modulated using the modulation modes supported by the first device respectively, acquiring a synchronization information of each modulation waveform, finding a start moment of each modulation waveform according to the synchronization information, demodulating the modulation waveform according to the start moment to obtain the first audio data, determining whether the first audio data is correct according to the predetermined rule, and if yes, obtaining the modulation modes correctly received by the second device and supported by the first device.

In an embodiment, the first device is further configured for: demodulating the second audio data stream sent from the second device, finding synchronization headers of the modulation waveforms modulated using the modulation modes supported by the second device respectively, acquiring a synchronization information of each modulation waveform, finding a start moment of each modulation waveform according to the synchronization information, demodulating the modulation waveform according to the start moment to obtain the second audio data, determining whether the second audio data is correct according to the predetermined rule, and if yes, obtaining the modulation modes correctly received by the first device and supported by the second device.

In an embodiment, the first audio data and the second audio data comprise data in a predetermined fixed format and/or transmission data containing variable contents.

In an embodiment, the first device is further configured for: modulating third audio data using the optimal modulation mode used in the second device to generate third audio data frame streams, in which the third audio data comprise the optimal modulation mode used in the second device and the optimal modulation mode used in the first device; and sending the third audio data frame streams to the second device via the audio interface of the first device.

In an embodiment, the first device is further configured for: modulating third audio data using the optimal modulation mode used in the second device to generate third audio data frame streams, in which the third audio data comprise the optimal modulation mode used in the second device, the optimal modulation mode used in the first device and audio data to be sent; and sending the third audio data frame streams to the second device via the audio interface of the first device.

In an embodiment, the second device is further configured for: obtaining the optimal modulation mode used in the second device and the optimal modulation mode used in the first device according to the third audio data frame streams, modulating response audio data using the optimal modulation mode used in the second device, and sending the modulated response audio data to the first device.

In an embodiment, the first audio data frame streams are generated by modulating the first audio data to be transmitted into an analog waveform signal using the modulation modes supported by the first device to generate the first audio data frame streams; and the second audio data frame streams are generated by modulating the second audio data to be transmitted into an analog waveform signal using the modulation modes supported by the second device to generate the second audio data frame streams.

In an embodiment, the first audio data further comprises identifiers of the at least two modulation modes supported by the first device; and the second audio data further comprises identifiers of the modulation modes obtained and correctly received by the second device and supported by the first device and identifiers of the at least two modulation modes supported by the second device.

In an embodiment, the first device is a mobile terminal, and the second device is an electronic signature token.

In order to achieve the above objectives, a mobile terminal for audio communication modulation mode self-adaptation according to embodiments of a third aspect of the present disclosure comprises: a modulating module configured for modulating first audio data to be sent using at least two modulation modes supported by the apparatus to generate first audio data frame streams in the at least two modulation modes; a splicing module configured for splicing the first audio data frame streams in the at least two modulation modes into a first audio data stream; a transceiver module configured for sending the first audio data stream to an electronic signature token via an audio interface of the mobile terminal, and receiving a second audio data stream sent from the electronic signature token, in which the electronic signature token is configured for digital signature; an acquiring module configured for demodulating the second audio data stream to obtain modulation modes correctly received by the mobile terminal and supported by the electronic signature token and modulation modes correctly received by the electronic signature token and supported by the mobile terminal; and a selecting module configured for selecting an optimal modulation mode used in the electronic signature token from the modulation modes correctly received by the electronic signature token and supported by the mobile terminal, and selecting an optimal modulation mode used in the mobile terminal from the modulation modes correctly received by the mobile terminal and supported by the electronic signature token, according to a predetermined rule.

The mobile terminal according to embodiments of the present disclosure may perform data interaction with the electronic signature token to determine the default modulation mode of the mobile terminal and the electronic signature token, thus enhancing the interaction speed, saving time, and ensuring the data interaction quality.

In an embodiment, the transceiver module is further configured for sending the first audio data stream to the electronic signature token via the audio interface of the mobile terminal at once and in a same time reference frame.

In an embodiment, the same time reference frame means that for each modulation waveform, an interval between a start moment and/or an end moment and a predetermined reference moment is predetermined.

In an embodiment, the acquiring module is further configured for: demodulating the second audio data stream, finding a start moment of each modulation waveform according to the predetermined reference moment, demodulating the modulation waveform according to the start moment to obtain the second audio data, determining whether the second audio data is correct according to the predetermined rule, and if yes, obtaining the modulation modes correctly received by the mobile terminal and supported by the electronic signature token.

In an embodiment, the transceiver module is further configured for sending the first audio data stream to the electronic signature token via the audio interface of the mobile terminal at once and in different time reference frames.

In an embodiment, the different time reference frames mean that for each modulation waveform, a start moment is carried in a synchronization header.

In an embodiment, the modulating module is further configured for: modulating the first audio data to be sent into the first audio data frame streams and generating a synchronization header information, and adding the generated synchronization header information to the first audio data frame streams for indicating a start moment of each modulation mode.

In an embodiment, the acquiring module is further configured for: demodulating the second audio data stream sent from the electronic signature token, finding synchronization headers of the modulation waveforms modulated using the modulation modes supported by the electronic signature token respectively, acquiring a synchronization information of each modulation waveform, finding a start moment of each modulation waveform according to the synchronization information, demodulating the modulation waveform according to the start moment to obtain the second audio data, determining whether the second audio data is correct according to the predetermined rule, and if yes, obtaining the modulation modes correctly received by the mobile terminal and supported by the electronic signature token.

In an embodiment, the first audio data and the second audio data comprise data in a predetermined fixed format and/or transmission data containing variable contents.

In an embodiment, the modulating module is further configured for: modulating third audio data using the optimal modulation mode used in the electronic signature token to generate third audio data frame streams, in which the third audio data comprise the optimal modulation mode used in the electronic signature token and the optimal modulation mode used in the mobile terminal, and the transceiver module is further configured for sending the third audio data frame streams to the electronic signature token via the audio interface of the mobile terminal.

In an embodiment, the modulating module is further configured for: modulating third audio data using the optimal modulation mode used in the electronic signature token to generate third audio data frame streams, in which the third audio data comprise the optimal modulation mode used in the electronic signature token, the optimal modulation mode used in the mobile terminal and audio data to be sent, and the transceiver module is further configured for sending the third audio data frame streams to the electronic signature token via the audio interface of the mobile terminal.

In an embodiment, the first audio data frame streams are generated by: modulating the first audio data to be transmitted into an analog waveform signal using the modulation modes supported by the mobile terminal to generate the first audio data frame streams.

In an embodiment, the first audio data further comprises identifiers of the at least two modulation modes supported by the mobile terminal; and the second audio data further comprises identifiers of the modulation modes obtained and correctly received by the electronic signature token and supported by the mobile terminal and identifiers of the at least two modulation modes supported by the electronic signature token.

In order to achieve the above objectives, an electronic signature token according to embodiments of a fourth aspect of the present disclosure comprises: a security module configured for digital signature; a transceiver module configured for receiving a first audio data stream sent from an mobile terminal for audio communication modulation mode self-adaptation in a mobile terminal, and sending a second audio data stream spliced by a splicing module to the mobile terminal via an audio interface; an acquiring module configured for demodulating the first audio data stream to obtain modulation modes correctly received by the electronic signature token and supported by the mobile terminal; a modulating module configured for modulating second audio data to be sent using at least two modulation modes supported by the electronic signature token to generate second audio data frame streams in the at least two modulation modes, in which the second audio data comprise the modulation modes correctly received by the electronic signature token and supported by the mobile terminal; and the splicing module configured for splicing the second audio data frame streams in the at least two modulation modes into the second audio data stream.

The electronic signature token according to embodiments of the present disclosure may perform data interaction with the mobile terminal quickly, thus enhancing the data interaction speed and saving time. Moreover, the distortion degree of the interactive data is reduced, thus ensuring the data interaction quality.

In an embodiment, the transceiver module is further configured for: sending the second audio data stream spliced by the splicing module to the mobile terminal via the audio interface at once and in a same time reference frame.

In an embodiment, the same time reference frame means that for each modulation waveform, an interval between a start moment and/or an end moment and a predetermined reference moment is predetermined.

In an embodiment, the acquiring module is further configured for: demodulating the first audio data stream, finding a start moment of each modulation waveform according to the pre-agreed reference time, demodulating the modulation waveform according to the start moment to obtain the first audio data, determining whether the first audio data is correct according to a predetermined rule, and if yes, obtaining the modulation modes correctly received by the electronic signature token and supported by the mobile terminal.

In an embodiment, the transceiver module is further configured for: sending the second audio data stream spliced by the splicing module to the mobile terminal via the audio interface at once and in different time reference frames.

In an embodiment, the different time reference frames mean that for each modulation waveform, a start moment is carried in a synchronization header information.

In an embodiment, the modulating module is further configured for: modulating the second audio data to be sent into the second audio data frame streams and generating a synchronization header information, and adding the generated synchronization header information to the second audio data frame streams for indicating a start moment of each modulation mode.

In an embodiment, the acquiring module is further configured for: demodulating the first audio data stream sent from the mobile terminal, finding synchronization headers of the modulation waveforms modulated using the modulation modes supported by the mobile terminal respectively, acquiring a synchronization information of each modulation waveform, finding a start moment of each modulation waveform according to the synchronization information, demodulating the modulation waveform according to the start moment to obtain the first audio data, determining whether the first audio data is correct according to a predetermined rule, and if yes, obtaining the modulation modes correctly received by the electronic signature token and supported by the mobile terminal.

In an embodiment, the first audio data and the second audio data comprise data in a predetermined fixed format and/or transmission data containing variable contents.

In an embodiment, the acquiring module is further configured for: obtaining an optimal modulation mode used in the electronic signature token and an optimal modulation mode used in the mobile terminal according to third audio data frame streams received by the transceiver module, modulating response audio data using the optimal modulation mode used in the electronic signature token, and sending the modulated response audio data to the mobile terminal.

In an embodiment, first audio data frame streams are generated by modulating the first audio data to be transmitted into an analog waveform signal using the modulation modes supported by the mobile terminal to generate the first audio data frame streams; and the second audio data frame streams are generated by modulating the second audio data to be transmitted into an analog waveform signal using the modulation modes supported by the electronic signature token to generate the second audio data frame streams.

In an embodiment, the first audio data further comprises identifiers of the at least two modulation modes supported by the mobile terminal; and the second audio data further comprises identifiers of the modulation modes obtained and correctly received by the electronic signature token and supported by the mobile terminal and identifiers of the at least two modulation modes supported by the electronic signature token.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or additional aspects and advantages of the present disclosure will become apparent and more readily appreciated from the following descriptions of embodiments made with reference to the drawings, in which.

DETAILED DESCRIPTION

Figure 1:
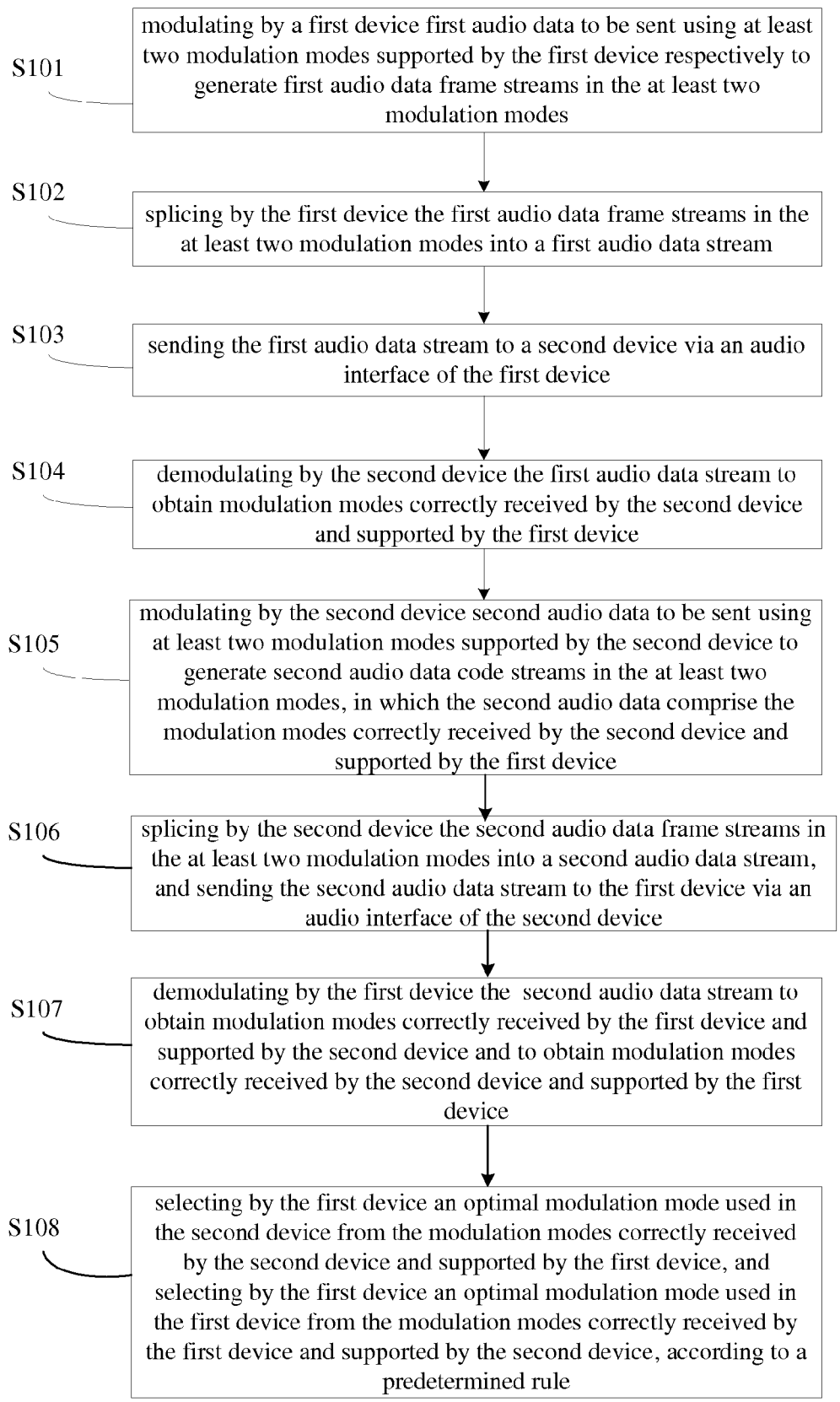
FIG. 1 is a flow chart of a method for audio communication modulation mode self-adaptation according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is on a second feature may include an embodiment in which the first feature directly contacts the second feature, and may also include an embodiment in which an additional feature is formed between the first feature and the second feature so that the first feature does not directly contact the second feature.

In the present disclosure, unless specified or limited otherwise, the terms "mounted," "connected," "coupled," and the like are used broadly, and may be, for example, mechanical or electrical connections; may also be direct connections or indirect connections via intervening structures; may also be inner communications of two elements, which can be understood by those skilled in the art according to specific situations.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

FIG. 1 illustrates a method for audio communication modulation mode self-adaptation according to an embodiment of the present disclosure. As shown in FIG. 1, the method for audio communication modulation mode self-adaptation comprises following steps.

At step S101, a first device modulates first audio data to be sent using at least two modulation modes supported by the first device respectively to generate first audio data frame streams in the at least two modulation modes. The first device may be a mobile terminal, and the mobile terminal may comprise a mobile phone, a tablet PC (personal computer), etc.

The modulation modes may comprise an amplitude modulation, a frequency modulation, a carrier modulation, a subcarrier modulation, etc. For example, the first device may modulate the first audio data using four downlink modulation modes respectively to generate first audio data frame streams A, B, C, D in the four downlink modulation modes.

At step S102, the first device splices the first audio data frame streams in the at least two modulation modes into a first audio data stream.

At step S103, the first audio data stream is sent to a second device via an audio interface of the first device.

For example, since the downlink audio data frame streams A, B, C, D in the four downlink modulation modes are spliced into the single first audio data stream, only one transmission may be performed, thus decreasing the number of data transmissions, reducing the probability of data distortion, and enhancing the data interaction speed.

At step S104, the second device demodulates the first audio data stream to obtain modulation modes correctly received by the second device and supported by the first device. The second device may be an electronic signature token, such as an audio Key (i.e. a Key apparatus with an audio interface), which is a cipher key apparatus substantially similar to a U shield except the data transmission mode.

For example, the second device determines that the modulation modes correctly received by the second device and supported by the first device are B, C, and D according to the first audio data stream, and A may not be received by the second device during the transmission or the format of data modulated using A is not correct.

At step S105, the second device modulates second audio data to be sent using at least two modulation modes supported by the second device to generate second audio data frame streams in the at least two modulation modes, in which the second audio data comprise the modulation modes correctly received by the second device and supported by the first device.

For example, the second device uses three downlink modulation modes corresponding to the first audio data frame streams B, C, D as sending contents and performs modulation according to four uplink modulation modes in the second device to generate second audio data frame streams E, F, G, H. Each of the second audio data frame streams E, F, G, H comprises three downlink modulation modes corresponding to the first audio data frame streams B, C, D.

At step S106, the second device splices the second audio data frame streams in the at least two modulation modes into a second audio data stream, and sends the second audio data stream to the first device via an audio interface of the second device.

At step S107, the first device demodulates the second audio data stream to obtain modulation modes correctly received by the first device and supported by the second device and to obtain modulation modes correctly received by the second device and supported by the first device.

At step S108, the first device selects an optimal modulation mode used in the second device from the modulation modes correctly received by the second device and supported by the first device, and selects an optimal modulation mode used in the first device from the modulation modes correctly received by the first device and supported by the second device, according to a predetermined rule.

The optimal modulation mode is a modulation mode selected according to the predetermined rule. For example, the optimal modulation mode is a modulation mode corresponding to a sampling data stream with a small waveform distortion degree and a small amplitude attenuation degree.

With the method for audio communication modulation mode self-adaptation according to embodiments of the present disclosure, since audio data frame streams modulated using various modulation modes are spliced into a single audio data stream, data interaction may be performed at once, thus enhancing the data interaction speed. Meanwhile, a first audio modulation mode may be quickly determined, such that the first device may communicate with the second device via the first audio modulation mode, thus further enhancing the data interaction speed and largely reducing the distortion degree of the interactive data.

In an embodiment, the first audio data and the second audio data comprise data in a predetermined fixed format and/or transmission data containing variable contents. According to the predetermined fixed format, it may be determined whether a fixed format corresponding to received audio data is consistent with the predetermined fixed format every time, if yes, data are correctly received, otherwise, data are wrongly received, thus ensuring the reliability of the received data.

In an embodiment, the first audio data stream are sent to the second device via the audio interface of the first device at once and in a same time reference frame, and the second audio data stream are sent to the first device via the audio interface of the second device at once and in a same time reference frame. The same time reference frame means that for each modulation waveform, an interval between a start moment and/or an end moment and a predetermined reference moment is predetermined.

In an embodiment, specifically, step S104 (i.e. demodulating by the second device the first audio data stream to obtain the modulation modes correctly received by the second device and supported by the first device) comprises: demodulating by the second device the first audio data stream, finding by the second device a start moment of each modulation waveform according to the predetermined reference moment, demodulating by the second device the modulation waveform according to the start moment to obtain the first audio data, determining by the second device whether the first audio data is correct according to the predetermined rule, and if yes, obtaining by the second device the modulation modes correctly received by the second device and supported by the first device. Therefore, it is possible to ensure the reliability of the first audio data received by the second device so as to obtain the modulation modes correctly received by the second device and supported by the first device.

In an embodiment, specifically, step S107 (i.e. demodulating by the first device the second audio data stream to obtain the modulation modes correctly received by the first device and supported by the second device and the modulation modes correctly received by the second device and supported by the first device) comprises: demodulating by the first device the second audio data stream, finding by the first device a start moment of each modulation waveform according to the predetermined reference moment, demodulating by the first device the modulation waveform according to the start moment to obtain the second audio data, determining by the first device whether the second audio data is correct according to the predetermined rule, and if yes, obtaining by the first device the modulation modes correctly received by the first device and supported by the second device. Since the second audio data comprise the modulation modes correctly received by the second device and supported by the first device, the first device also obtains the modulation modes correctly received by the second device and supported by the first device. Therefore, it is possible to ensure the reliability of the second audio data received by the first device so as to obtain the modulation modes correctly received by the first device and supported by the second device.

In an embodiment, the first audio data stream are sent to the second device via the audio interface of the first device at once and in different time reference frames, and the second audio data stream are sent to the first device via the audio interface of the second device at once and in different time reference frames. The different time reference frames mean that for each modulation waveform, a start moment is carried in a synchronization header information.

Therefore, in an embodiment, generating the first audio data frame streams by the first device (step S101) comprises modulating by the first device the first audio data to be sent into the first audio data frame streams and generating by the first device a synchronization header information, and adding by the first device the generated synchronization header information to the first audio data frame streams for indicating a start moment of each modulation mode; and generating the second audio data frame streams by the second device (step S107) comprises modulating by the second device the second audio data to be sent into the second audio data frame streams and generating by the second device a synchronization header information, and adding by the second device the generated synchronization header information to the second audio data frame streams for indicating a start moment of each modulation mode.

In an embodiment, specifically, step S104 (i.e. demodulating by the second device the first audio data stream to obtain the modulation modes correctly received by the second device and supported by the first device) comprises: demodulating by the second device the first audio data stream sent from the first device, finding by the second device synchronization headers of the modulation waveforms modulated using the modulation modes supported by the first device respectively, acquiring by the second device a synchronization information of each modulation waveform, finding by the second device a start moment of each modulation waveform according to the synchronization information, demodulating by the second device the modulation waveform according to the start moment to obtain the first audio data, determining by the second device whether the first audio data is correct according to the predetermined rule, and if yes, obtaining by the second device the modulation modes correctly received by the second device and supported by the first device. Therefore, it is possible to ensure the reliability of the first audio data received by the second device so as to obtain the modulation modes correctly received by the second device and supported by the first device.

In an embodiment, specifically, step S107 (i.e. demodulating by the first device the second audio data stream to obtain the modulation modes correctly received by the first device and supported by the second device and the modulation modes correctly received by the second device and supported by the first device) comprises: demodulating by the first device the second audio data stream sent from the second device, finding by the first device synchronization headers of the modulation waveforms modulated using the modulation modes supported by the second device respectively, acquiring by the first device a synchronization information of each modulation waveform, finding by the first device a start moment of each modulation waveform according to the synchronization information, demodulating by the first device the modulation waveform according to the start moment to obtain the second audio data, determining by the first device whether the second audio data is correct according to the predetermined rule, and if yes, obtaining by the first device the modulation modes correctly received by the first device and supported by the second device. Since the second audio data comprises the modulation modes correctly received by the second device and supported by the first device, the first device also obtains the modulation modes correctly received by the second device and supported by the first device. Therefore, it is possible to ensure the reliability of the second audio data received by the first device so as to obtain the modulation modes correctly received by the first device and supported by the second device.

In an embodiment, the method for audio communication modulation mode self-adaptation further comprises: modulating by the first device third audio data using the optimal modulation mode used in the second device to generate third audio data frame streams, in which the third audio data comprise the optimal modulation mode used in the second device and the optimal modulation mode used in the first device; and sending by the first device the third audio data frame streams to the second device via the audio interface of the first device.

In an embodiment, the method for audio communication modulation mode self-adaptation further comprises: modulating by the first device third audio data using the optimal modulation mode used in the second device to generate third audio data frame streams, in which the third audio data comprise the optimal modulation mode used in the second device, the optimal modulation mode used in the first device and audio data to be sent; and sending by the first device the third audio data frame streams to the second device via the audio interface of the first device. Therefore, the modulation modes may be sent when data are transmitted normally for the first time.

Meanwhile, in an embodiment, the method for audio communication modulation mode self-adaptation further comprises: obtaining by the second device the optimal modulation mode used in the second device and the optimal modulation mode used in the first device according to the third audio data frame streams, modulating by the second device response audio data using the optimal modulation mode used in the second device, and sending by the second device the modulated response audio data to the first device.

In an embodiment, the first audio data frame streams are generated by modulating the first audio data to be transmitted into an analog waveform signal using the modulation modes supported by the first device to generate the first audio data frame streams; and the second audio data frame streams are generated by modulating the second audio data to be transmitted into an analog waveform signal using the modulation modes supported by the second device to generate the second audio data frame streams.

In an embodiment, the first audio data further comprises identifiers of the at least two modulation modes supported by the first device; and the second audio data further comprises identifiers of the modulation modes obtained and correctly received by the second device and supported by the first device and identifiers of the at least two modulation modes supported by the second device. That is, each modulation mode has an identifier, and each device stores its own modulation modes and demodulation modes as well as demodulation modes of the other device, and searches for a modulation mode corresponding to an identifier according to the identifier.

Figure 2:
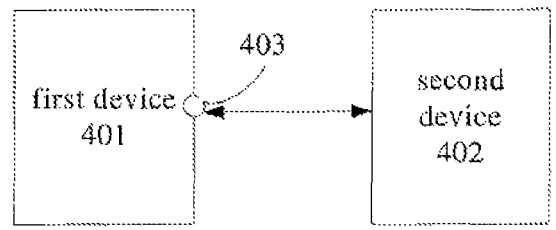
FIG. 2 is a schematic diagram of a system for audio communication modulation mode self-adaptation according to an embodiment of the present disclosure.

In order to implement the above embodiments, the present disclosure further provides a system for audio communication modulation mode self-adaptation. FIG. 2 is a schematic diagram of a system for audio communication modulation mode self-adaptation according to an embodiment of the present disclosure. As shown in FIG. 2, the system for audio communication modulation mode self-adaptation comprises a first device 401 and a second device 402 connected with each other via an audio interface 403. The first device 401 may be a mobile terminal, and the mobile terminal may comprise a mobile phone, a tablet PC (personal computer), etc. The second device 402 may be an electronic signature token, such as an audio Key (i.e. a key apparatus with an audio interface), which is a cipher key apparatus substantially similar to a U shield except the data transmission mode.

Specifically, the first device 401 is configured for modulating first audio data to be sent using at least two modulation modes supported by the first device 401 respectively to generate first audio data frame streams in the at least two modulation modes, splicing the first audio data frame streams in the at least two modulation modes into a first audio data stream, sending the first audio data stream to the second device 402 via the audio interface 403, demodulating a second audio data stream to obtain modulation modes correctly received by the first device 401 and supported by the second device 402 and to obtain modulation modes correctly received by the second device 402 and supported by the first device 401, and selecting an optimal modulation mode used in the second device 402 from the modulation modes correctly received by the second device 402 and supported by the first device 401, and selecting an optimal modulation mode used in the first device 401 from the modulation modes correctly received by the first device 401 and supported by the second device 402, according to a predetermined rule. More specifically, the modulation modes may comprise an amplitude modulation, a frequency modulation, a carrier modulation, a subcarrier modulation, etc. For example, the first device 401 may modulate the first audio data using four downlink modulation modes respectively to generate first audio data frame streams A, B, C, D in the four downlink modulation modes, splice the downlink audio data frame streams A, B, C, D in the four downlink modulation modes into the first audio data stream, and send the first audio data stream to the second device 402.

The second device 402 is configured for demodulating the first audio data stream to obtain modulation modes correctly received by the second device 402 and supported by the first device 401, modulating second audio data to be sent using at least two modulation modes supported by the second device 402 to generate second audio data frame streams in the at least two modulation modes, in which the second audio data comprise the modulation modes correctly received by the second device 402 and supported by the first device 401, splicing the second audio data frame streams in the at least two modulation modes into the second audio data stream, and sending the second audio data stream to the first device 401 via an audio interface (i.e. an audio interface of the second device 402, not shown). For example, the second device 402 determines that the modulation modes correctly received by the second device and supported by the first device 401 are B, C, and D according to the first audio data stream, and A may not be received by the second device 402 during the transmission or the format of data modulated using A is not correct. The second device 402 uses three downlink modulation modes corresponding to the first audio data frame streams B, C, D as sending contents and performs modulation according to four uplink modulation modes in the second device to generate second audio data frame streams E, F, G, H. Each of the second audio data frame streams E, F, G, H comprises three downlink modulation modes corresponding to the first audio data frame streams B, C, D.

With the system for audio communication modulation mode self-adaptation according to embodiments of the present disclosure, since audio data frame streams modulated using various modulation modes are spliced into a single audio data stream, data interaction may be performed at once, thus enhancing the data interaction speed. Meanwhile, a first audio modulation mode may be quickly determined, such that the first device may communicate with the second device using the first audio modulation mode, thus further enhancing the data interaction speed and largely reducing the distortion degree of the interactive data.

In an embodiment, the first audio data and the second audio data comprise data in a predetermined fixed format and/or transmission data containing variable contents.

In an embodiment, the first audio data stream is sent to the second device 402 via the audio interface 403 of the first device 401 at once and in a same time reference frame, and the second audio data stream is sent to the first device 401 via the audio interface of the second device 402 at once and in a same time reference frame. The same time reference frame means that for each modulation waveform, an interval between a start moment and/or an end moment and a predetermined reference moment is predetermined.

In an embodiment, the second device 402 is further configured for: demodulating the first audio data stream, finding a start moment of each modulation waveform according to the predetermined reference moment, demodulating the modulation waveform according to the start moment to obtain the first audio data, determining whether the first audio data is correct according to the predetermined rule, and if yes, obtaining the modulation modes correctly received by the second device 402 and supported by the first device 401.

In an embodiment, the first device 401 is further configured for: demodulating the second audio data stream, finding a start moment of each modulation waveform according to the predetermined reference moment, demodulating the modulation waveform according to the start moment to obtain the second audio data, determining whether the second audio data is correct according to the predetermined rule, and if yes, obtaining the modulation modes correctly received by the first device 401 and supported by the second device 402.

In an embodiment, alternatively, the first audio data stream is sent to the second device 402 via the audio interface 403 of the first device 401 at once and in different time reference frames, and the second audio data stream is sent to the first device 401 via the audio interface of the second device 402 at once and in different time reference frames. The different time reference frames mean that for each modulation waveform, a start moment is carried in a synchronization header information.

In an embodiment, the first device 401 modulates the first audio data to be sent into the first audio data frame streams and generates a synchronization header information, and adds the generated synchronization header information to the first audio data frame streams for indicating a start moment of each modulation mode; the second device 402 modulates the second audio data to be sent into the second audio data frame streams and generates a synchronization header information, and adds the generated synchronization header information to the second audio data frame streams for indicating a start moment of each modulation mode.

In an embodiment, the second device 402 is further configured for: demodulating the first audio data stream sent from the first device 401, finding synchronization headers of the modulation waveforms modulated using the modulation modes supported by the first device 401 respectively, acquiring a synchronization information of each modulation waveform, finding a start moment of each modulation waveform according to the synchronization information, demodulating the modulation waveform according to the start moment to obtain the first audio data, determining whether the first audio data is correct according to the predetermined rule, and if yes, obtaining the modulation modes correctly received by the second device 402 and supported by the first device 401.

In an embodiment, the first device 401 is further configured for: demodulating the second audio data stream sent from the second device 402, finding synchronization headers of the modulation waveforms modulated using the modulation modes supported by the second device 402 respectively, acquiring a synchronization information of each modulation waveform, finding a start moment of each modulation waveform according to the synchronization information, demodulating the modulation waveform according to the start moment to obtain the second audio data, determining whether the second audio data is correct according to the predetermined rule, and if yes, obtaining the modulation modes correctly received by the first device 401 and supported by the second device 402.

In an embodiment, the first device 401 is further configured for: modulating third audio data using the optimal modulation mode used in the second device 402 to generate third audio data frame streams, in which the third audio data comprise the optimal modulation mode used in the second device 402 and the optimal modulation mode used in the first device 401; and sending the third audio data frame streams to the second device 402 via the audio interface of the first device 401.

In an embodiment, the first device 401 is further configured for: modulating third audio data using the optimal modulation mode used in the second device 402 to generate third audio data frame streams, in which the third audio data comprise the optimal modulation mode used in the second device 402, the optimal modulation mode used in the first device 401 and audio data to be sent; and sending the third audio data frame streams to the second device 402 via the audio interface of the first device 401.

In an embodiment, the second device 402 is further configured for: obtaining the optimal modulation mode used in the second device 402 and the optimal modulation mode used in the first device 401 according to the third audio data frame streams, modulating response audio data using the optimal modulation mode used in the second device 402, and sending the modulated response audio data to the first device 401.

In an embodiment, the first audio data to be transmitted are modulated into an analog waveform signal using the modulation modes supported by the first device 401 to generate the first audio data frame streams; the second audio data to be transmitted are modulated into an analog waveform signal using the modulation modes supported by the second device 402 to generate the second audio data frame streams.

Figure 3:
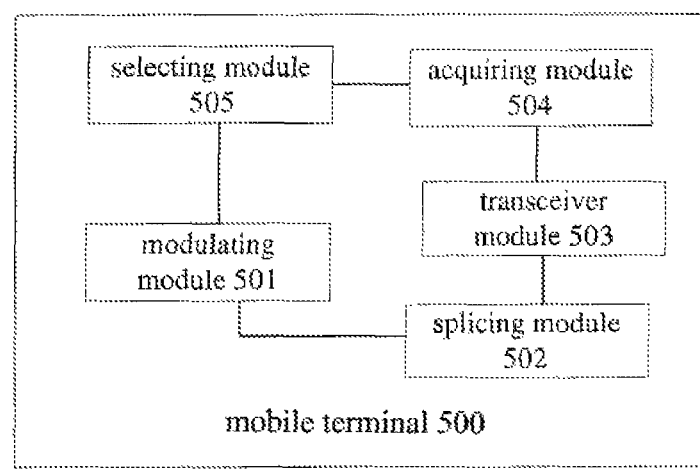
FIG. 3 is a schematic diagram of an mobile terminal for audio communication modulation mode self-adaptation according to an embodiment of the present disclosure.

In order to implement the above embodiments, the present disclosure further provides a mobile terminal for audio communication modulation mode self-adaptation. FIG. 3 is a schematic diagram of a mobile terminal for audio communication modulation mode self-adaptation according to an embodiment of the present disclosure. As shown in FIG. 3, the mobile terminal 500 comprises: a modulating module 501, a splicing module 502, a transceiver module 503, an acquiring module 504, and a selecting module 505.

The modulating module 501 is configured for modulating first audio data to be sent using at least two modulation modes supported by the mobile terminal to generate first audio data frame streams in the at least two modulation modes. The splicing module 502 is configured for splicing the first audio data frame streams in the at least two modulation modes into a first audio data stream. The transceiver module 503 is configured for sending the first audio data stream to an electronic signature token via an audio interface of the mobile terminal 500 at once and in a same time reference frame, and receiving a second audio data stream sent from the electronic signature token, in which the electronic signature token is configured for digital signature, verification or key calculation. The acquiring module 504 is configured for demodulating the second audio data stream to obtain modulation modes correctly received by the mobile terminal 500 and supported by the electronic signature token and modulation modes correctly received by the electronic signature token and supported by the mobile terminal 500. The selecting module 505 is configured for selecting an optimal modulation mode used in the electronic signature token from the modulation modes correctly received by the electronic signature token and supported by the mobile terminal 500, and selecting an optimal modulation mode used in the mobile terminal 500 from the modulation modes correctly received by the mobile terminal 500 and supported by the electronic signature token, according to a predetermined rule.

In an embodiment, the transceiver module 503 is further configured for sending the first audio data stream to the electronic signature token via the audio interface of the mobile terminal 500 at once and in a same time reference frame. The same time reference frame means that for each modulation waveform, an interval between a start moment and/or an end moment and a predetermined reference moment is predetermined.

In an embodiment, the acquiring module 504 is further configured for: demodulating the second audio data stream, finding a start moment of each modulation waveform according to the predetermined reference moment, demodulating the modulation waveform according to the start moment to obtain the second audio data, determining whether the second audio data is correct according to the predetermined rule, and if yes, obtaining the modulation modes correctly received by the mobile terminal 500 and supported by the electronic signature token.

In an embodiment, the transceiver module 503 is further configured for sending the first audio data stream to the electronic signature token via the audio interface of the mobile terminal 500 at once and in different time reference frames. The different time reference frames mean that for each modulation waveform, a start moment is carried in a synchronization header information.

In an embodiment, the modulating module 501 is further configured for: modulating the first audio data to be sent into the first audio data frame streams and generating a synchronization header information, and adding the generated synchronization header information to the first audio data frame streams for indicating a start moment of each modulation mode.

In an embodiment, the acquiring module 504 is further configured for: demodulating the second audio data stream sent from the electronic signature token, finding synchronization headers of the modulation waveforms modulated using the modulation modes supported by the electronic signature token respectively, acquiring a synchronization information of each modulation waveform, finding a start moment of each modulation waveform according to the synchronization information, demodulating the modulation waveform according to the start moment to obtain the second audio data, determining whether the second audio data is correct according to the predetermined rule, and if yes, obtaining the modulation modes correctly received by the mobile terminal 500 and supported by the electronic signature token.

In an embodiment, the first audio data and the second audio data comprise data in a predetermined fixed format and/or transmission data containing variable contents.

In another embodiment, the modulating module 501 is further configured for: modulating third audio data using the optimal modulation mode used in the electronic signature token to generate third audio data frame streams, in which the third audio data comprise the optimal modulation mode used in the electronic signature token and the optimal modulation mode used in the mobile terminal 500, and the transceiver module 503 is further configured for sending the third audio data frame streams to the electronic signature token via the audio interface of the mobile terminal 500.

Furthermore, in an embodiment, the modulating module 501 is further configured for: modulating third audio data using the optimal modulation mode used in the electronic signature token to generate third audio data frame streams, in which the third audio data comprise the optimal modulation mode used in the electronic signature token, the optimal modulation mode used in the mobile terminal 500 and audio data to be sent, and the transceiver module 503 is further configured for sending the third audio data frame streams to the electronic signature token via the audio interface of the mobile terminal 500.

In an embodiment, the first audio data to be transmitted are modulated into an analog waveform signal using the modulation modes supported by the mobile terminal 500 to generate the first audio data frame streams.

Concerning the operation process of the mobile terminal according to embodiments of the present disclosure, reference is made to the operation process of the first device in the method according to embodiments of the present disclosure and the operation process of the first device of the system according to embodiments of the present disclosure.

The mobile terminal according to embodiments of the present disclosure may perform data interaction with the electronic signature token to determine the default modulation mode of the mobile terminal and the electronic signature token, thus enhancing the data interaction speed, saving time, and ensuring the data interaction quality.

In order to implement the above embodiments, the present disclosure further provides an electronic signature token.

Figure 4:
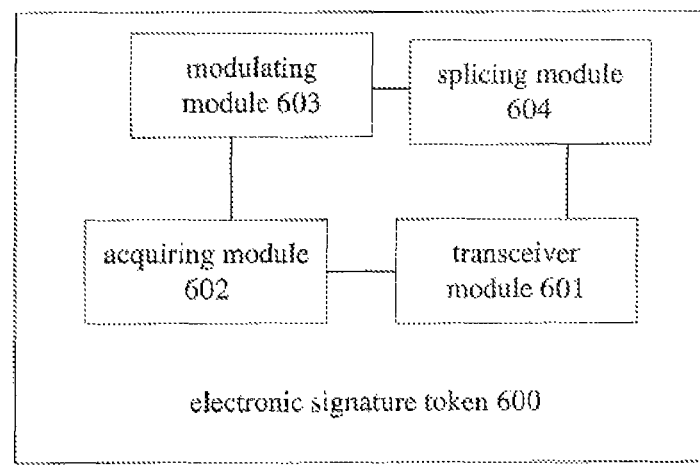
FIG. 4 is a schematic diagram of an electronic signature token according to an embodiment of the present disclosure.

FIG. 4 illustrates an electronic signature token according to an embodiment of the present disclosure. As shown in FIG. 4, the electronic signature token 600 comprises: a security module (not shown), a transceiver module 601, an acquiring module 602, a modulating module 603, and a splicing module 604.

The security module is configured for digital signature, verification or key calculation.

The transceiver module 601 is configured for receiving a first audio data stream sent from the mobile terminal 500, and sending a second audio data stream spliced by the splicing module 604 to the mobile terminal 500 via an audio interface. The acquiring module 602 is configured for demodulating the first audio data stream to obtain modulation modes correctly received by the electronic signature token 600 and supported by the mobile terminal 500. The modulating module 603 is configured for modulating second audio data to be sent using at least two modulation modes supported by the electronic signature token 600 to generate second audio data frame streams in the at least two modulation modes, in which the second audio data comprise the modulation modes correctly received by the electronic signature token 600 and supported by the mobile terminal 500. The splicing module 604 is configured for splicing the second audio data frame streams in the at least two modulation modes into the second audio data stream.

In an embodiment, the transceiver module 601 is further configured for: sending the second audio data stream spliced by the splicing module 604 to the mobile terminal 500 via the audio interface at once and in a same time reference frame. The same time reference frame means that for each modulation waveform, an interval between a start moment and/or an end moment and a predetermined reference moment is predetermined.

In an embodiment, the acquiring module 602 is further configured for: demodulating the first audio data stream, finding a start moment of each modulation waveform according to the predetermined reference moment, demodulating the modulation waveform according to the start moment to obtain the first audio data, determining whether the first audio data is correct according to a predetermined rule, and if yes, obtaining the modulation modes correctly received by the electronic signature token and supported by the mobile terminal 500.

In an embodiment, the transceiver module 601 is further configured for: sending the second audio data stream spliced by the splicing module 604 to the mobile terminal 500 via the audio interface at once and in different time reference frames. The different time reference frames mean that for each modulation waveform, a start moment is carried in a synchronization header information.

In an embodiment, the modulating module 603 is further configured for: modulating the second audio data to be sent into the second audio data frame streams and generating a synchronization header information, and adding the generated synchronization header information to the second audio data frame streams for indicating a start moment of each modulation mode.

In an embodiment, the acquiring module 602 is further configured for: demodulating the first audio data stream sent from the mobile terminal 500, finding synchronization headers of the modulation waveforms modulated using the modulation modes supported by the mobile terminal 500 respectively, acquiring a synchronization information of each modulation waveform, finding a start moment of each modulation waveform according to the synchronization information, demodulating the modulation waveform according to the start moment to obtain the first audio data, determining whether the first audio data is correct according to a predetermined rule, and if yes, obtaining the modulation modes correctly received by the electronic signature token 600 and supported by the mobile terminal 500.

In an embodiment, the first audio data and the second audio data comprise data in a predetermined fixed format and/or transmission data containing variable contents.

In an embodiment, the acquiring module 602 is further configured for: obtaining an optimal modulation mode used in the electronic signature token 600 and an optimal modulation mode used in the mobile terminal 500 according to third audio data frame streams received by the transceiver module 601, modulating response audio data using the optimal modulation mode used in the electronic signature token 600, and sending the modulated response audio data to the mobile terminal 500.

In an embodiment, first audio data frame streams are generated by modulating the first audio data to be transmitted into an analog waveform signal using the modulation modes supported by the mobile terminal 500 to generate the first audio data frame streams; and the second audio data frame streams are generated by modulating the second audio data to be transmitted into an analog waveform signal using the modulation modes supported by the electronic signature token 600 to generate the second audio data frame streams.

Concerning the operation process of the electronic signature token according to embodiments of the present disclosure, reference is made to the operation process of the second device in the method according to embodiments of the present disclosure and the operation process of the second device of the system according to embodiments of the present disclosure.

The electronic signature token according to embodiments of the present disclosure may perform data interaction with the mobile terminal quickly, thus enhancing the data interaction speed and saving time. Moreover, the distortion degree of the interactive data is reduced, thus ensuring the data interaction quality.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, optical disks, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for audio communication modulation mode self-adaptation, comprising:
    modulating by a first device first audio data to be sent using at least two modulation modes supported by the first device respectively to generate first audio data frame streams in the at least two modulation modes;
    splicing by the first device the first audio data frame streams in the at least two modulation modes into a first audio data stream;
    sending the first audio data stream to a second device via an audio interface of the first device;
    demodulating by the second device the first audio data stream to obtain modulation modes correctly received by the second device and supported by the first device;
    modulating by the second device second audio data to be sent using at least two modulation modes supported by the second device to generate second audio data frame streams in the at least two modulation modes, wherein the second audio data comprise the modulation modes correctly received by the second device and supported by the first device;
    splicing by the second device the second audio data frame streams in the at least two modulation modes into a second audio data stream, and sending the second audio data stream to the first device via an audio interface of the second device;
    demodulating by the first device the second audio data stream to obtain modulation modes correctly received by the first device and supported by the second device and to obtain modulation modes correctly received by the second device and supported by the first device; and
    selecting by the first device an optimal modulation mode used in the second device from the modulation modes correctly received by the second device and supported by the first device, and selecting by the first device an optimal modulation mode used in the first device from the modulation modes correctly received by the first device and supported by the second device, according to a predetermined rule.

2. The method according to claim 1, wherein sending the first audio data stream to the second device via the audio interface of the first device comprises sending the first audio data stream to the second device via the audio interface of the first device at once and in a same time reference frame; and
    wherein sending the second audio data stream to the first device via the audio interface of the second device comprises sending the second audio data stream to the first device via the audio interface of the second device at once and in a same time reference frame,
    wherein the same time reference frame means that for each modulation waveform, an interval between a start moment and/or an end moment and a predetermined reference moment is predetermined.

3. The method according to claim 2, wherein demodulating by the second device the first audio data stream to obtain the modulation modes correctly received by the second device and supported by the first device comprises:
    demodulating by the second device the first audio data stream, finding by the second device a start moment of each modulation waveform according to the predetermined reference moment, demodulating by the second device the modulation waveform according to the start moment to obtain the first audio data, determining by the second device whether the first audio data is correct according to the predetermined rule, and if yes, obtaining by the second device the modulation modes correctly received by the second device and supported by the first device; and/or wherein demodulating by the first device the second audio data stream to obtain the modulation modes correctly received by the first device and supported by the second device and the modulation modes correctly received by the second device and supported by the first device comprises:

demodulating by the first device the second audio data stream, finding by the first device a start moment of each modulation waveform according to the predetermined reference moment, demodulating by the first device the modulation waveform according to the start moment to obtain the second audio data, determining by the first device whether the second audio data is correct according to the predetermined rule, and if yes, obtaining by the first device the modulation modes correctly received by the first device and supported by the second device.

4. The method according to claim 1, wherein sending the first audio data stream to the second device via the audio interface of the first device comprises sending the first audio data stream to the second device via the audio interface of the first device at once and in different time reference frames; and wherein sending the second audio data stream to the first device via the audio interface of the second device comprises sending the second audio data stream to the first device via the audio interface of the second device at once and in different time reference frames, wherein the different time reference frames mean that for each modulation waveform, a start moment is carried in a synchronization header information.

5. The method according to claim 4, wherein generating the first audio data frame streams by the first device comprises modulating by the first device the first audio data to be sent into the first audio data frame streams and generating by the first device a synchronization header information, and adding by the first device the generated synchronization header information to the first audio data frame streams for indicating a start moment of each modulation mode; and wherein generating the second audio data frame streams by the second device comprises modulating by the second device the second audio data to be sent into the second audio data frame streams and generating by the second device a synchronization header information, and adding by the second device the generated synchronization header information to the second audio data frame streams for indicating a start moment of each modulation mode.

6. The method according to claim 5, wherein demodulating by the second device the first audio data stream to obtain the modulation modes correctly received by the second device and supported by the first device comprises:

demodulating by the second device the first audio data stream sent from the first device, finding by the second device synchronization headers of the modulation waveforms modulated using the modulation modes supported by the first device respectively, acquiring by the second device a synchronization information of each modulation waveform, finding by the second device a start moment of each modulation waveform according to the synchronization information, demodulating by the second device the modulation waveform according to the start moment to obtain the first audio data, determining by the second device whether the first audio data is correct according to the predetermined rule, and if yes, obtaining by the second device the modulation modes correctly received by the second device and supported by the first device; and/or wherein demodulating by the first device the second audio data stream to obtain the modulation modes correctly received by the first device and supported by the second device and the modulation modes correctly received by the second device and supported by the first device comprises:

demodulating by the first device the second audio data stream sent from the second device, finding by the first device synchronization headers of the modulation waveforms modulated using the modulation modes supported by the second device respectively, acquiring by the first device a synchronization information of each modulation waveform, finding by the first device a start moment of each modulation waveform according to the synchronization information, demodulating by the first device the modulation waveform according to the start moment to obtain the second audio data, determining by the first device whether the second audio data is correct according to the predetermined rule, and if yes, obtaining by the first device the modulation modes correctly received by the first device and supported by the second device.

7. The method according to claim 1, further comprising:

modulating by the first device third audio data using the optimal modulation mode used in the second device to generate third audio data frame streams, wherein the third audio data comprise the optimal modulation mode used in the second device and the optimal modulation mode used in the first device, or the third audio data comprise the optimal modulation mode used in the second device and the optimal modulation mode used in the first device and audio data to be sent; and sending by the first device the third audio data frame streams to the second device via the audio interface of the first device, wherein the method further comprises:

obtaining by the second device the optimal modulation mode used in the second device and the optimal modulation mode used in the first device according to the third audio data frame streams, modulating by the second device response audio data using the optimal modulation mode used in the second device, and sending by the second device the modulated response audio data to the first device.

8. The method according to claim 1, wherein the first audio data further comprises identifiers of the at least two modulation modes supported by the first device; and the second audio data further comprises identifiers of the modulation modes obtained and correctly received by the second device and supported by the first device and identifiers of the at least two modulation modes supported by the second device.

9. A system for audio communication modulation mode self-adaptation, comprising a first device and a second device connected with each other via audio interfaces, wherein the first device is configured for modulating first audio data to be sent using at least two modulation modes supported by the first device respectively to generate first audio data frame streams in the at least two modulation modes, splicing the first audio data frame streams in the at least two modulation modes into a first audio data stream, sending the first audio data stream to the second device via the audio interface of the first device, demodulating a second audio data stream to obtain modulation modes correctly received by the first device and supported by the second device and to obtain modulation modes correctly received by the second device and supported by the first device, and selecting an optimal modulation mode used in the second device from the modulation modes correctly received by the second device and supported by the first device, and selecting an optimal modulation mode used in the first device from the modulation modes correctly received by the first device and supported by the second device, according to a predetermined rule;

the second device is configured for demodulating the first audio data stream to obtain modulation modes correctly received by the second device and supported by the first device, modulating second audio data to be sent using at least two modulation modes supported by the second device to generate second audio data frame streams in the at least two modulation modes, in which the second audio data comprise the modulation modes correctly received by the second device and supported by the first device, splicing the second audio data frame streams in the at least two modulation modes into the second audio data stream, and sending the second audio data stream to the first device via the audio interface of the second device.

10. The system according to claim 9, wherein sending the first audio data stream to the second device via the audio interface of the first device comprises sending the first audio data stream to the second device via the audio interface of the first device at once and in a same time reference frame; and wherein sending the second audio data stream to the first device via the audio interface of the second device comprises sending the second audio data stream to the first device via the audio interface of the second device at once and in a same time reference frame, wherein the same time reference frame means that for each modulation waveform, an interval between a start moment and/or an end moment and a predetermined reference moment is predetermined.

11. The system according to claim 10, wherein the second device is further configured for:

demodulating the first audio data stream, finding a start moment of each modulation waveform according to the predetermined reference moment, demodulating the modulation waveform according to the start moment to obtain the first audio data, determining whether the first audio data is correct according to the predetermined rule, and if yes, obtaining the modulation modes correctly received by the second device and supported by the first device; and/or wherein the first device is further configured for:

demodulating the second audio data stream, finding a start moment of each modulation waveform according to the predetermined reference moment, demodulating the modulation waveform according to the start moment to obtain the second audio data, determining whether the second audio data is correct according to the predetermined rule, and if yes, obtaining the modulation modes correctly received by the first device and supported by the second device.

12. The system according to claim 9, wherein sending the first audio data stream to the second device via the audio interface of the first device comprises sending the first audio data stream to the second device via the audio interface of the first device at once and in different time reference frames; and wherein sending the second audio data stream to the first device via the audio interface of the second device comprises sending the second audio data stream to the first device via the audio interface of the second device at once and in different time reference frames, wherein the different time reference frames mean that for each modulation waveform, a start moment is carried in a synchronization header information.

13. The system according to claim 12, wherein generating the first audio data frame streams by the first device comprises modulating by the first device the first audio data to be sent into the first audio data frame streams and generating by the first device a synchronization header information, and adding by the first device the generated synchronization header information to the first audio data frame streams for indicating a start moment of each modulation mode; and wherein generating the second audio data frame streams by the second device comprises modulating by the second device the second audio data to be sent into the second audio data frame streams and generating by the second device a synchronization header information, and adding by the second device the generated synchronization header information to the second audio data frame streams for indicating a start moment of each modulation mode, wherein the second device is further configured for:

demodulating the first audio data stream sent from the first device, finding synchronization headers of the modulation waveforms modulated using the modulation modes supported by the first device respectively, acquiring a synchronization information of each modulation waveform, finding a start moment of each modulation waveform according to the synchronization information, demodulating the modulation waveform according to the start moment to obtain the first audio data, determining whether the first audio data is correct according to the predetermined rule, and if yes, obtaining the modulation modes correctly received by the second device and supported by the first device.

14. The system according to claim 13, wherein the first device is further configured for:

demodulating the second audio data stream sent from the second device, finding synchronization headers of the modulation waveforms modulated using the modulation modes supported by the second device respectively, acquiring a synchronization information of each modulation waveform, finding a start moment of each modulation waveform according to the synchronization information, demodulating the modulation waveform according to the start moment to obtain the second audio data, determining whether the second audio data is correct according to the predetermined rule, and if yes, obtaining the modulation modes correctly received by the first device and supported by the second device.

15. The system according to claim 9, wherein the first device is further configured for:

modulating third audio data using the optimal modulation mode used in the second device to generate third audio data frame streams, wherein the third audio data comprise the optimal modulation mode used in the second device and the optimal modulation mode used in the first device, or the third audio data comprise the optimal modulation mode used in the second device, the optimal modulation mode used in the first device and audio data to be sent; and sending the third audio data frame streams to the second device via the audio interface of the first device, wherein the second device is further configured for:

obtaining the optimal modulation mode used in the second device and the optimal modulation mode used in the first device according to the third audio data frame streams, modulating response audio data using the optimal modulation mode used in the second device, and sending the modulated response audio data to the first device.

16. The system according to claim 9, wherein the first audio data further comprises identifiers of the at least two modulation modes supported by the first device; and the second audio data further comprises identifiers of the modulation modes obtained and correctly received by the second device and supported by the first device and identifiers of the at least two modulation modes supported by the second device.

17. A mobile terminal for audio communication modulation mode self-adaptation, comprising:

a modulating module configured for modulating first audio data to be sent using at least two modulation modes supported by the mobile terminal to generate first audio data frame streams in the at least two modulation modes;

a splicing module configured for splicing the first audio data frame streams in the at least two modulation modes into a first audio data stream;

a transceiver module configured for sending the first audio data stream to an electronic signature token via an audio interface of the mobile terminal, and receiving a second audio data stream sent from the electronic signature token, wherein the electronic signature token is configured for digital signature;

an acquiring module configured for demodulating the second audio data stream received to obtain modulation modes correctly received by the mobile terminal and supported by the electronic signature token, and to obtain modulation modes correctly received by the electronic signature token and supported by the mobile terminal; and a selecting module configured for selecting an optimal modulation mode used in the electronic signature token from the modulation modes correctly received by the electronic signature token and supported by the mobile terminal, and selecting an optimal modulation mode used in the mobile terminal from the modulation modes correctly received by the mobile terminal and supported by the electronic signature token, according to a predetermined rule.

18. The mobile terminal according to claim 17, wherein the transceiver module is further configured for sending the first audio data stream to the electronic signature token via the audio interface of the mobile terminal at once and in a same time reference frame, wherein the same time reference frame means that for each modulation waveform, an interval between a start moment and/or an end moment and a predetermined reference moment is predetermined.

19. The mobile terminal according to claim 18, wherein the acquiring module is further configured for:

demodulating the second audio data stream, finding a start moment of each modulation waveform according to the predetermined reference moment, demodulating the modulation waveform according to the start moment to obtain the second audio data, determining whether the second audio data is correct according to the predetermined rule, and if yes, obtaining the modulation modes correctly received by the mobile terminal and supported by the electronic signature token.

20. The mobile terminal according to claim 17, wherein the transceiver module is further configured for sending the first audio data stream to the electronic signature token via the audio interface of the mobile terminal at once and in different time reference frames, wherein the different time reference frames mean that for each modulation waveform, a start moment is carried in a synchronization header information.

21. The mobile terminal according to claim 20, wherein the modulating module is further configured for:

modulating the first audio data to be sent into the first audio data frame streams and generating a synchronization header information, and adding the generated synchronization header information to the first audio data frame streams for indicating a start moment of each modulation mode; and/or wherein the acquiring module is further configured for:

demodulating the second audio data stream sent from the electronic signature token, finding synchronization headers of the modulation waveforms modulated using the modulation modes supported by the electronic signature token respectively, acquiring a synchronization information of each modulation waveform, finding a start moment of each modulation waveform according to the synchronization information, demodulating the modulation waveform according to the start moment to obtain the second audio data, determining whether the second audio data is correct according to the predetermined rule, and if yes, obtaining the modulation modes correctly received by the mobile terminal and supported by the electronic signature token.

22. The mobile terminal according to claim 17, wherein the modulating module is further configured for:

modulating third audio data using the optimal modulation mode used in the electronic signature token to generate third audio data frame streams, in which the third audio data comprise the optimal modulation mode used in the electronic signature token and the optimal modulation mode used in the mobile terminal, or the third audio data comprise the optimal modulation mode used in the electronic signature token, the optimal modulation mode used in the mobile terminal and audio data to be sent; and the transceiver module is further configured for sending the third audio data frame streams to the electronic signature token via the audio interface of the mobile terminal.

23. The mobile terminal according to claim 17, wherein the first audio data further comprises identifiers of the at least two modulation modes supported by the mobile terminal; and the second audio data further comprises identifiers of the modulation modes obtained and correctly received by the electronic signature token and supported by the mobile terminal and identifiers of the at least two modulation modes supported by the electronic signature token.

24. An electronic signature token, comprising:

a security module configured for digital signature;

a transceiver module configured for receiving a first audio data stream sent from an mobile terminal for audio communication modulation mode self-adaptation, and sending a second audio data stream spliced by a splicing module to the mobile terminal via an audio interface;

an acquiring module configured for demodulating the first audio data stream to obtain modulation modes correctly received by the electronic signature token and supported by the mobile terminal;

a modulating module configured for modulating second audio data to be sent using at least two modulation modes supported by the electronic signature token to generate second audio data frame streams in the at least two modulation modes, wherein the second audio data comprise the modulation modes correctly received by the electronic signature token and supported by the mobile terminal; and the splicing module configured for splicing the second audio data frame streams in the at least two modulation modes into the second audio data stream.

25. The electronic signature token according to claim 24, wherein the transceiver module is further configured for:

sending the second audio data stream spliced by the splicing module to the mobile terminal via the audio interface at once and in a same time reference frame, wherein the same time reference frame means that for each modulation waveform, an interval between a start moment and/or an end moment and a predetermined reference moment is predetermined.

26. The electronic signature token according to claim 25, wherein the acquiring module is further configured for:

demodulating the first audio data stream, finding a start moment of each modulation waveform according to the predetermined reference moment, demodulating the modulation waveform according to the start moment to obtain the first audio data, determining whether the first audio data is correct according to a predetermined rule, and if yes, obtaining the modulation modes correctly received by the electronic signature token and supported by the mobile terminal.

27. The electronic signature token according to claim 24, wherein the transceiver module is further configured for:

sending the second audio data stream spliced by the splicing module to the mobile terminal via the audio interface at once and in different time reference frames, wherein the different time reference frames mean that for each modulation waveform, a start moment is carried in a synchronization header information.

28. The electronic signature token according to claim 27, wherein the modulating module is further configured for:

modulating the second audio data to be sent into the second audio data frame streams and generating a synchronization header information, and adding the generated synchronization header information to the second audio data frame streams for indicating a start moment of each modulation mode, wherein the acquiring module is further configured for:

demodulating the first audio data stream sent from the mobile terminal, finding synchronization headers of the modulation waveforms modulated using the modulation modes supported by the mobile terminal respectively, acquiring a synchronization information of each modulation waveform, finding a start moment of each modulation waveform according to the synchronization information, demodulating the modulation waveform according to the start moment to obtain the first audio data, determining whether the first audio data is correct according to a predetermined rule, and if yes, obtaining the modulation modes correctly received by the electronic signature token and supported by the mobile terminal.

29. The electronic signature token according to claim 28, wherein the acquiring module is further configured for:

obtaining an optimal modulation mode used in the electronic signature token and an optimal modulation mode used in the mobile terminal according to third audio data frame streams received by the transceiver module, modulating response audio data using the optimal modulation mode used in the electronic signature token, and sending the modulated response audio data to the mobile terminal.

30. The electronic signature token according to claim 24, wherein the first audio data further comprises identifiers of the at least two modulation modes supported by the mobile terminal; and the second audio data further comprises identifiers of the modulation modes obtained and correctly received by the electronic signature token and supported by the mobile terminal and identifiers of the at least two modulation modes supported by the electronic signature token.

* * * * *